United States Patent
Kamijo (10) Patent No.: US 7,106,882 B2
(45) Date of Patent: Sep. 12, 2006

(54) DATA EMBEDDING, DETECTION, AND PROCESSING

(75) Inventor: Koichi Kamijo, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 626 days.

(21) Appl. No.: 10/114,753

(22) Filed: Apr. 2, 2002

(65) Prior Publication Data
US 2002/0191811 A1    Dec. 19, 2002

(30) Foreign Application Priority Data
Jun. 4, 2001 (JP) .............. 2001-109108

(51) Int. Cl.
*G06K 9/00* (2006.01)

(52) U.S. Cl. ................................. 382/100
(58) Field of Classification Search ......... 382/100
See application file for complete search history.

(56) References Cited

U.S. PATENT DOCUMENTS

| | | | |
|---|---|---|---|
| 5,809,139 A * | 9/1998 | Girod et al. ............. | 380/202 |
| 6,037,984 A * | 3/2000 | Isnardi et al. ........... | 375/240.21 |
| 6,104,826 A * | 8/2000 | Nakagawa et al. ........ | 382/100 |
| 6,792,129 B1 * | 9/2004 | Zeng et al. ............. | 382/100 |
| 2002/0007403 A1 * | 1/2002 | Echizen et al. .......... | 709/217 |

OTHER PUBLICATIONS

Japanese Publication No. 10-234012 published on Sep. 2, 1998.

* cited by examiner

*Primary Examiner*—Jingge Wu
*Assistant Examiner*—Tom Y. Lu
(74) *Attorney, Agent, or Firm*—Louis P. Herzberg (57) ABSTRACT

The invention provides methods, apparatus and systems for providing robustness relative to data compression and conversion for additional information embedded into digital content. Before predetermined additional information is embedded into digital content, the state following the embedding of additional information is set for the feature values that are used for the embedding of the additional information, so that the distribution of the feature values obtained following the embedding conforms to a predetermined function. Then, based on the setting contents, the feature values of the digital content are changed. In the information detection process, when the digital content in which the additional information is embedded is compressed, a predetermined distribution of the feature values of the digital content is employed to reproduce the distribution of the digital content feature values in the state preceding the conversion. Based on this reproduced distribution, the additional information embedded into the digital content is detected.

27 Claims, 6 Drawing Sheets

| Compression ratio | Q value for d = 9 | Information embedded | | No information embedded | |
|---|---|---|---|---|---|
| | | Equation 5 | Equation 11 | Equation 5 | Equation 11 |
| No compression | | 24.40 | 24.40 | -0.26 | -0.26 |
| 1/50 | 12 | 22.49 | 23.58 | -0.03 | 0.15 |
| 1/80 | 30 | 15.45 | 23.89 | -0.10 | 0.45 |
| 1/85 | 40 | 10.08 | 20.73 | 0.57 | 0.05 |

DATA EMBEDDING, DETECTION, AND PROCESSING

FIELD OF THE INVENTION

The present invention relates to data processing. It more particularly relates to a method for embedding additional information into digital content, and detecting the additional information.

BACKGROUND

Digital content (hereinafter referred to simply as content), such as images or speech, can be easily copied without undergoing any deterioration. Therefore, currently, additional information, such as control signals for controlling reproduction equipment, data related to the content owners or verification data for preventing data alteration, is being embedded into content to inhibit its copying and alteration. This additional information must be invisibly or inaudibly embedded using a form that does not adversely affect content when that content is employed normally (when an image is displayed or speech is reproduced).

The employment or distribution of moving images as digital data has become popular only relatively recently, but as a result, the protection of copyrights for content having high added value, such as movies, has rapidly grown in importance. Thus, provisions for controlling the copying and reproduction of content have been discussed that include the embedding of the above described additional information. It is presently expected that the protection of DVD (Digital Versatile Disk) content recordings is the practical field for which this control technique will be applied.

For the protection of DVD content, additional information is first embedded into the data for an original image (Base-Band domain). Then, the baseband domain data in which the additional information has been embedded is compressed using MPEG (Moving Picture Experts Group)(MPEG2), and the compressed data is recorded on a DVD and distributed. The data compression that is employed in this instance attenuates the signals that are embedded as additional information into the DVD content.

Generally, when the baseband domain of the content in which the additional information is embedded is compressed using JPEG (Joint Photographic Experts Group) or MPEG, or is converted into digital or analog data, or when this baseband domain of the content is recorded or reproduced by, for example, a home video system, it is highly probable that the signals embedded as additional information will be attenuated. For example, when q denotes the quantized value (hereinafter referred to as a Q value) of predetermined DCT (discrete cosine transform) coefficients used for the compression and x denotes the DCT coefficients after the additional information has been embedded, if $|x|<q/2$ is satisfied, the value of x is rounded up to 0 and it does not contribute to the detection of the embedded information.

As is described above, when the additional information is embedded into digital content, the signals so embedded are attenuated by data compression, AD/DA conversion, or so. If instead, the additional information can be embedded in accordance with a Q value used for data compression, the robustness of the data compression can be increased. However, it is generally true that the Q value used for compression is not known in advance.

There is a method whereby additional information is embedded into the data of a compressed domain to prevent the deterioration of the additional information due to data compression. However, according to this method, since the information can be embedded only by employing multiple of the Q value used for data compression, the image quality will probably be degraded, thereby rendering this method impractical.

SUMMARY OF THE INVENTION

It is therefore an aspect of the present invention to provide robustness for additional information, before it is embedded into digital content, that enables it to resist the attenuating effects of data compression or conversion.

It is another aspect of the present invention to embed additional information, which is sufficiently robust to withstand the effects of data compression, without taking into account any correlation with a quantized value (Q value) used for data compression.

To achieve these aspects, according to the present invention, additional information is embedded, so that the distribution of the feature values of DCT coefficients (hereinafter referred to simply as feature values) obtained after the additional information has been embedded conforms to a predetermined function. Then, the parameters of the distribution function in the embedding process are inversely calculated and the additional information is detected and recovered from the digital content for which signals have been attenuated due to compression or post-processing.

Also according to the present invention, a data embedding apparatus for embedding additional information into a digital image is provided. Specifically, the data embedding apparatus comprises: a feature value state setting unit, for setting a post-embedding state of the distribution of feature values of the digital image that are used for embedding additional information; a feature values rearrangement unit, for rearranging feature values for the digital image based on the sizes, e.g., in descending order, and for employing a perceptual model to indicate a permissible range for the changes in the sizes of the feature values; and an additional information embedding unit, for changing the feature values of the digital image based on the post-embedding state set by the feature value state setting unit, for changing the feature values correlated by the feature rearrangement unit, and for changing the permissible range for the changes, wherein the feature value state setting unit sets the post-embedding state, so that the distribution of the feature values, after the additional information has been embedded into the digital content, conforms to a predetermined function.

BRIEF DESCRIPTION OF THE DRAWINGS

These and other aspects, features, and advantages of the present invention will become apparent upon further consideration of the following detailed description of the invention when read in conjunction with the drawing figures, in which.

DESCRIPTION OF THE SYMBOLS

10: Embedding apparatus
11: Feature value state setting unit
12: Feature value rearrangement unit
13: Additional information embedding unit
20: Detection apparatus
21: File form identification unit
22: Quantized value inverse calculator
23: Feature value state reproduction unit
24: First additional information detector
25: Second additional information detector

DESCRIPTION OF THE INVENTION

The present invention provides methods, apparatus and systems wherein additional information is embedded, so that the distribution of the feature values of DCT coefficients (hereinafter referred to simply as feature values) obtained after the additional information has been embedded conforms to a predetermined function. Then, the parameters of the distribution function in the embedding process are inversely calculated and the additional information is detected and recovered from the digital content for which signals have been attenuated due to compression or post-processing.

In order to embed the additional information in the above described manner, according to the present invention, a data embedding apparatus for embedding additional information into digital content comprises: a feature value state setting unit, for setting the post-embedding state for feature values (e.g., luminance values) for the digital content that are used for embedding the additional information, so that after the additional information has been embedded into the digital content, the distribution of the feature values conforms to a predetermined function; and an additional information embedding unit, for changing the feature values of the digital content based on the state set by the feature value state setting unit.

When the feature values used for embedding the additional information are DCT coefficients, the feature value state setting unit sets the post-embedding state so that, after the additional information has been embedded into the digital content, the distribution of the DCT coefficients conforms to a predetermined function. The additional information embedding unit changes the DCT coefficients of the digital content, so that the distribution of the DCT coefficients conforms to the predetermined function.

According to the present invention, a data embedding apparatus for embedding additional information into a digital image is provided. In an example embodiment, the data embedding apparatus comprises: a feature value state setting unit, for setting a post-embedding state of the distribution of feature values of the digital image that are used for embedding additional information; a feature values rearrangement unit, for rearranging feature values for the digital image based on the sizes, e.g., in descending order, and for employing a perceptual model to indicate a permissible range for the changes in the sizes of the feature values; and an additional information embedding unit, for changing the feature values of the digital image based on the post-embedding state set by the feature value state setting unit, for changing the feature values correlated by the feature rearrangement unit, and for changing the permissible range for the changes, wherein the feature value state setting unit sets the post-embedding state, so that the distribution of the feature values, after the additional information has been embedded into the digital content, conforms to a predetermined function.

The additional information embedding unit can change the feature values, while adjusting the feature values so they fall within the permissible range determined based on a predetermined rule, in order not to degrade an image after the additional information is embedded.

In order to detect additional information embedded in the above described manner, according to the present invention, a detection apparatus for detecting predetermined additional information in digital content comprises: a feature value state reproduction unit, for reproducing, based on the distribution of predetermined feature values for digital content in which the predetermined additional information is embedded and for which a predetermined data conversion has been performed, the distribution of feature values for the digital content in the state existing prior to the performance of data conversion; and an additional information detector, for detecting the additional information embedded into the digital content based on the distribution of the feature values reproduced by the feature value state reproduction unit, i.e., the distribution of the feature values for the digital content for which data conversion is performed.

The feature value state reproduction unit obtains a function used to embed additional information into digital content to be detected, calculates a parameter of the function based on the function and the distribution of feature values in the digital content for which data conversion has been performed, and employs the parameter to reproduce the distribution of the feature values for the digital content in the state existing prior to the performance of data conversion.

When, as data conversion, data compression using quantization is performed for the digital content in which additional information has been embedded, the above detection apparatus can be constituted as follows. Specifically, the detection apparatus comprises: a quantized value calculation unit, for calculating, based on the distribution of feature values of digital content that has been compressed by quantization and then decompressed, a quantized value used for data compression; and an additional information detector, for employing the quantized value, obtained by the quantized value calculation unit, to detect additional information embedded into the digital content.

In further embodiments, the detection apparatus further comprises: a feature value state reproduction unit for employing the quantized value, obtained by the quantized value calculation unit, to reproduce the distribution of feature values, for the digital content, as in the state existing before the performance of data compression. In this case, the additional information detector detects the additional information embedded into the digital content based on the distribution of the feature values for the digital content, reproduced by the feature value state reproduction unit, as in the state existing before data compression was performed.

The detection apparatus according to the present invention can also be constituted as follows. The detection apparatus comprises: determination means, for determining, after additional information has been embedded into digital content, whether a predetermined data conversion process has been performed for the digital content; and detection means, for detecting the additional information embedded into the digital content, wherein, when the determination means ascertains that the predetermined data conversion has been performed for the digital content in which the additional information has been embedded, the detection means obtains the function used to embed the additional information into the digital content, and employs the function to detect the additional information embedded into the digital content.

According to the present invention, an example embodiment of data processing method for embedding predetermined additional information into digital content comprises the steps of: even after the data conversion has been performed, specifying a function that can reproduce, for the digital content in which the additional information is embedded, the detection strength in the state existing before the performance of the data conversion; and embedding the additional information into the digital content in accordance with the function.

Furthermore, according to the invention, a data processing method for embedding predetermined additional information into digital content and for detecting the additional information embedded into the digital content comprises the steps of: setting the post-embedding state for feature values of a digital content that are used for embedding additional information, so that the distribution of the feature values of the digital content in which additional information has been embedded conforms to a predetermined function; changing the feature values of the digital content based on the post-embedding state; determining whether data conversion has been performed for the digital content in which the additional information has been embedded; when it is ascertained the data conversion has been performed for the digital content, employing the distribution of predetermined feature values of the digital content to reproduce the distribution of the feature values for the digital content in the state existing before the performance of the data conversion; and detecting the additional information embedded into the digital content based on the distribution of the feature values for the reproduced digital content in the state existing before the performance of the data conversion.

The step of setting the post-embedding state of the feature values includes the step of: determining a function used to embed the additional information into the digital content. The step of reproducing the distribution of the feature values for the digital content in the state existing before the performance of the data conversion includes the steps of: calculating a parameter for the function based on the function and the distribution of the feature values for the digital content in which the data conversion has been performed; and employing the parameter to reproduce the distribution of the feature values for the digital content in the state existing before the performance of the data conversion.

At the step of determining the function, the function is determined based on detection information obtained when a temporary additional information detection process is performed for digital content in which embedding of the additional information has not yet been performed. The present invention can be provided as a program that permits a computer to implement the functions of the components of the data embedding apparatus. This program can be provided by being stored on a magnetic disk or another storage medium, or by being distributed by a program transmission apparatus via a network.

The present invention can also be provided as a program that permits a computer to implement the functions of the components of the detection apparatus. This program can be provided by being stored on a magnetic disk or another storage medium, or by being distributed by a program transmission apparatus via a network.

An advantageous embodiment of the present invention will now be described in detail while referring to the accompanying drawings. In this embodiment, an embedding apparatus, for embedding additional information into digital content, and a detection apparatus, for detecting additional information embedded into the digital content by the embedding apparatus, are provided. Also, in this embodiment the digital content in which additional information is to be embedded is an image file. It should be noted that this image may be either a moving picture or a static picture. It is assumed that the image file in which additional information is embedded by the embedding apparatus is compressed using MPEG or JPEG, and that the detection apparatus detects additional information embedded into a compressed image file or in a decompressed image file.

Figure 1:
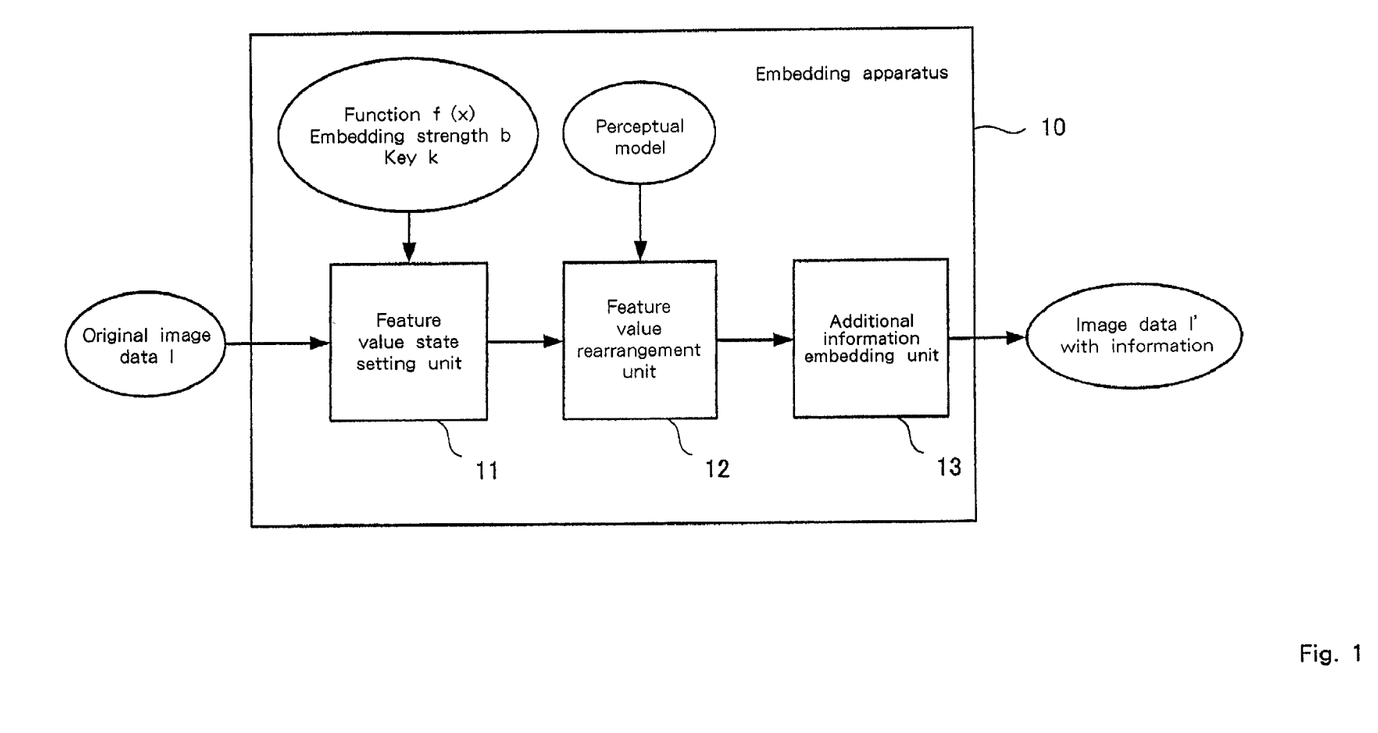
FIG. 1 is a diagram showing an example configuration, according to one embodiment of the present invention, of an embedding apparatus for embedding additional information.

FIG. 1 is a diagram showing an example configuration of an embedding apparatus, for embedding additional information, according to the present invention. In FIG. 1, an embedding apparatus 10 in this embodiment comprises a feature value state setting unit 11, a feature value rearrangement unit 12 and an additional information embedding unit 13. The embedding apparatus 10 may be implemented as a personal computer, a workstation or another computer system, and the components in FIG. 1 are software blocks implemented by a CPU that is controlled by a program. The program that controls the CPU can be provided by being stored on a recording medium, such as a magnetic disk or an optical disk, or by being distributed by a program transmission apparatus via a network. When the thus provided program is read into the memory of the computer and assumes control of the CPU, the computer functions as the embedding apparatus 10.

In the embedding apparatus 10 in FIG. 1, the feature value state setting unit 11 receives original image data I in which additional information is to be embedded, as well as an embedding strength b, a probability density function f(x), employed following the data embedding, and a secret key k supplied as information for used when embedding the additional information. These data either may be set in advance and recorded on a magnetic disk or another appropriate recording device (not shown) from which they are read by the feature value state setting unit 11 before additional information is embedded, or may be individually entered by an operator, each time additional information is to be embedded, or automatically generated under the control of the program.

The feature value state setting unit 11 employs these obtained data to determine the parameters $(a_1, \ldots, a_m)$ for the probability density function f(x), in accordance with the feature values of the original image data I (for an equation 20, which will be described later, two parameters, a and b, are determined). When these parameters are reflected as the feature values of the original image data I, the distribution of the feature values conforms to the probability density function f(x), which is obtained following the embedding of the additional information.

The feature value rearrangement unit 12 sorts the feature values for the embedding process performed by the additional information embedding unit 13, which will be described later. Through this sorting, the distribution of the feature values can easily be arranged so as to conform to a form similar to the function f(x). For example, when DCT coefficients are employed as the feature values, the values of the DCT coefficients in the image data in which the additional information is embedded are sorted in descending order.

Furthermore, based on a perceptual model that is recorded in advance in an appropriate recording device (not shown), the feature value rearrangement unit 12 determines the permissible range for the changes in the feature values in the image data in which the additional information has been embedded. The perceptual model is an algorithm for adjusting the image quality in order to prevent the deterioration of the quality of the original image data I in which the additional information has been embedded. Suppose that the pixel value is to be changed by a value of ten by embedding the additional information. When the pixel value is changed by a value of ten in a flat portion, such as the image "The sky with no cloud", wherein the change in the attribute of the luminance value is less, this is a remarkable change. However, when the pixel value is changed by a value of ten in a portion, such as the image "The downtown area", wherein the luminance value is changed greatly (a portion wherein the attribute of a color is changed drastically), this is not a very remarkable change. Therefore, the feature value rearrangement unit 12 designates a permissible range wherein such an area is selected, and additional information is embedded therein to adjust the image quality.

Based on the sorting results obtained by the feature value rearrangement unit 12, the additional information embedding unit 13 changes the feature values of the original image data I to embed additional information. For example, assume that the DCT coefficients are employed as the feature values, and that, as is described above, the values of the DCT coefficients are rearranged in descending order by the feature value rearrangement unit 12 and the distribution of the DCT coefficients conforms to equation 20, which will be described later. In this case, the value of the probability density function f(x) can be adjusted, while the DCT coefficients and the values in equation 20 are correlated with each other, beginning with the greatest values.

However, depending on the image, sorting of the feature values by the feature value rearrangement unit 12 may not be successful, and the obtained distribution may not conform to the form provided by the requested probability density function f(x). In this case, each feature value should be changed to adjust the distribution so that it closely corresponds to a form for the probability density function f(x). At this time, the feature values are adjusted within the permissible range determined by the feature value rearrangement unit 12. If it is impossible to adjust the feature values so that they fall within the permissible range, the feature values are changed so that the distribution of these values is as close as possible to that for the probability density function f(x). The distribution for the feature values of the resultant image data (i.e., the image data in which the additional information has been embedded) obtained by the additional information embedding unit 13 conforms to the probability density function f(x) employed after the embedding.

Through this processing, image data I', along with the additional information that has been embedded, is generated using the original image data I.

Figure 2:
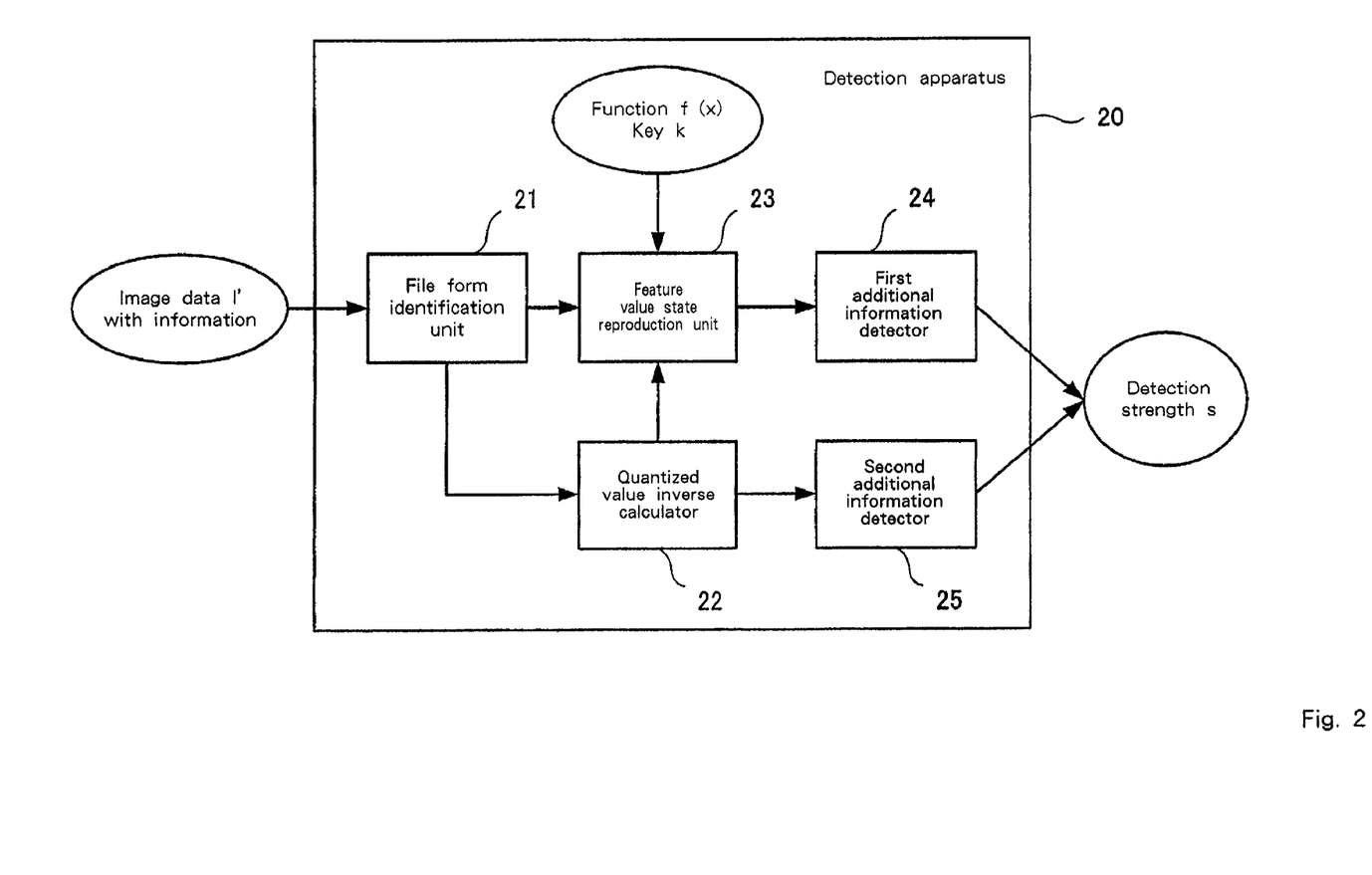
FIG. 2 is a diagram showing an example configuration, according to the embodiment, of a detection apparatus for detecting additional information.

The additional information that the embedding apparatus 10 embeds into the original image data I can include a variety of various arbitrary data, such as:
  a control signal for controlling a reproduction device for an image file
  data concerning an image file sender that is to be embedded in order to validate the ownership or to detect the presence of an unauthorized copy
  personal data for an image file recipient that is to be embedded in order to prevent the distribution of unauthorized copies
  data to confirm the source of information and to use to confirm data have not been altered FIG. 2 is a diagram showing the configuration of the detection apparatus according to the embodiment for detecting additional information. In FIG. 2, a detection apparatus 20 for this embodiment comprises: a file form identification unit 21, a quantized value inverse calculator 22, a feature value state reproduction unit 23, a first additional information detector 24 and a second additional information detector 25.

The detection apparatus 20 is implemented as a personal computer, a workstation or another computer system, and the components in FIG. 2 are software blocks implemented by a CPU that is controlled by a program. The program that controls the CPU can be provided by being stored on a recording medium, such as a magnetic disk or an optical disk, or by being distributed by a program transmission apparatus via a network. When the thus provided program is read into the memory of the computer and assumes control of the CPU, the computer functions as the detection apparatus 20.

In the detection apparatus 20 in FIG. 2, the file form identification unit 21 identifies the file form of the input image data I' in which information is embedded (i.e., the image data I' in which the additional information is to be detected). The file forms for the image data I' to be detected may be either a compressed file or an uncompressed file. The file form identification unit 21 employs the extension added to the name of the input file to determine whether the image data I' is a compressed file or an uncompressed file. When the image data I' is a compressed file, it is transmitted to the feature value state reproduction unit 23, while when the image data I' is an uncompressed file, it is transmitted to the quantized value inverse calculator 22.

The quantized value inverse calculator 22 determines whether the uncompressed file received from the file form identification unit 21 has been decompressed or is a file that has not been changed since it was generated by the embedding apparatus 10. When the histogram of the feature values of the image data I' has been fixed at each of several predetermined steps (widths), it is ascertained that the image data I' has been compressed once and then decompressed.

Figure 3:
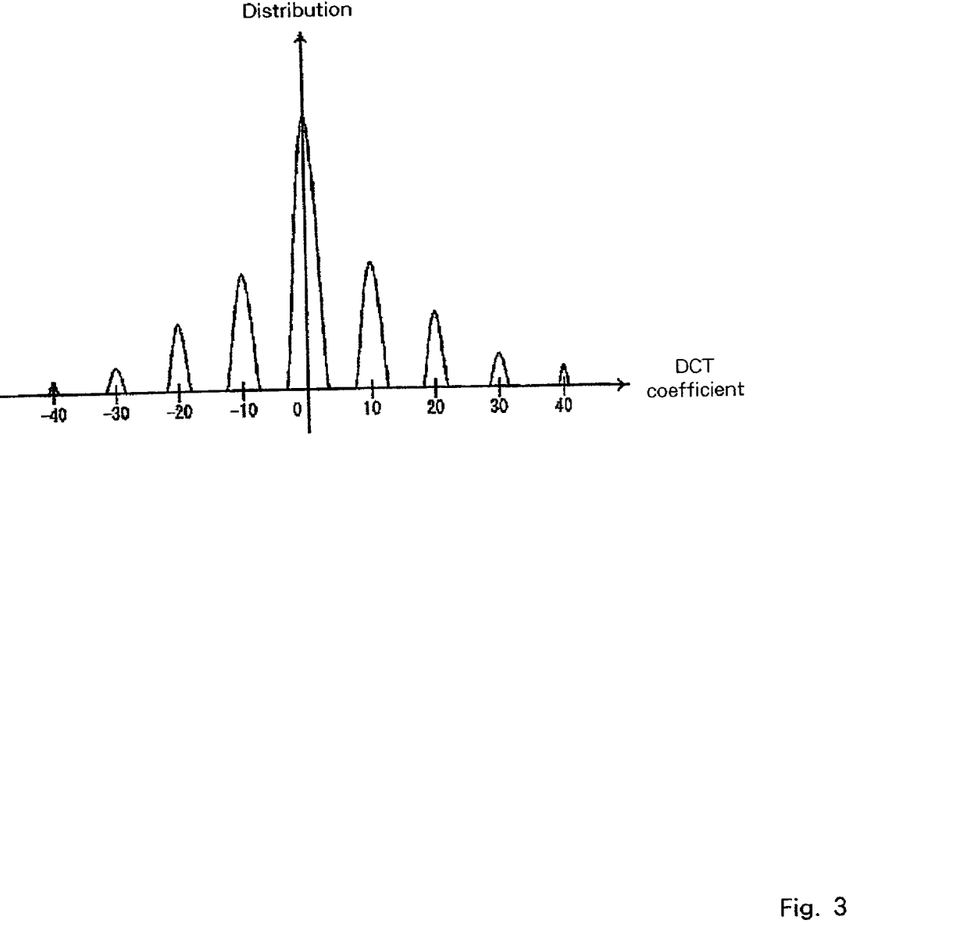
FIG. 3 is a graph showing an example distribution of feature values in an image file that has been compressed using quantization.

Further, when it is ascertained that the image data I' is a file that has been compressed once and then decompressed, the quantized value inverse calculator 22 transmits the image data I' and its Q value q (>1) to the feature value state reproduction unit 23. Whereas when it is ascertained that the image data I' is a file that when received had never been compressed, the image data I' and its Q value q (=1) are transmitted to the second additional information detector 25. For example, when the distribution of the feature values for predetermined image data I' for which embedded information indicates that the form is as shown in FIG. 3, it is ascertained that the image data I' is a file that was compressed once and then decompressed, and the Q value q is ten. Therefore, the image data I' and the Q value q=10 are transmitted to the feature value state reproduction unit 23. For the compressed image data I' received from the file form identification unit 21, or the image data I' for which the Q value q received from the quantized value inverse calculator 22 is q>1, the feature value state reproduction unit 23 performs an inverse calculation and obtains the parameters for the probability density function f(x) that was used to embed additional information into the image data I'.

Upon receiving image data I' in which additional information has been embedded, the feature value state reproduction unit 23 obtains the secret key K and the same probability density function f(x) (except for the parameter values) as was used by the feature value state setting unit 11 of the embedding apparatus 10. The feature value state reproduction unit 23 then employs these obtained data to perform the inverse calculation of the parameters. These data may either be set in advance and stored on a magnetic disk or another appropriate recording device (not shown) and read therefrom by the feature value state reproduction unit 23 for the embedding of additional information, or may be entered individually by an operator each time additional information is embedded, or generated automatically under control of the program. A detailed explanation will be given later for the method used to inversely calculate the parameters for the probability density function f(x) and for recovering the distribution of the feature values.

The first additional information detector 24 employs the parameters obtained by the feature value state reproduction unit 23 to calculate the detection strength of the additional information embedded into the image data I'. The method used to obtain the detection strength of the additional information will be described later in detail. The second additional information detector 25 obtains the detection strength of the additional information that is embedded into the image data I' received from the quantized value inverse calculator 22. In this case, since the image data I' is not compressed, the additional information is not attenuated, so that the detection strength of the additional information can be acquired using the conventional method.

A specific explanation will now be given for the additional information embedding and detection methods used by the embedding apparatus 10 and the thus arranged detection apparatus 20. First, an explanation will be given for a statistical method that is used for the embedding and detection of additional information. This statistical method is performed on the assumption that, when detection of the additional information is performed for content in which no additional information has been embedded, the distribution of the detection strengths of signals conforms to a predetermined well known distribution function (e.g., a normal distribution function; it should be noted that the average of the detection strengths is 0). According to this method, to embed or detect additional information, the feature values are changed, so that the changes exceed the threshold value T that is determined using a false positive ratio (the detection result obtained when the detection of additional information is performed for content in which no additional information has been embedded). This method is effective when the false positive ratio is determined in advance, as in the DVD copy protection (for DHSG (Data Hiding Sub Group) DVD copy protection, 10–12 times each ten seconds).

As a simple example, an explanation will be given for a case wherein one bit of additional information is embedded by using one uncompressed image frame recorded in a YUV format and the obtained image file is compressed, and wherein the additional information is then detected in the compressed image file. The coefficient of one predetermined DCT element (DCT coefficient), obtained following the performance of the DCT transform for the luminance element of the original image, is employed as the feature value used to embed additional information. The Q value of the DCT coefficient is defined uniformly as q for the entire frame.

To embed t bits of additional information into the image frame, a target image need only be divided into t blocks, and one bit may be embedded into each block by employing the method of the invention. To embed additional information across multiple DCT coefficients, this method should merely be performed for the DCT coefficients. Further, when multiple Q values are employed for the compression of the image frame, the method of the invention need only be employed for the Q values. Thus, in the following explanation, generality will not be lost.

Assume that (8H*8V) pixels are the size of the original image data I in which additional information is to be embedded, d (0<d<64) denotes the index for a DCT element (AC) used for embedding additional information, and R denotes a random number that is generated by using the secret key K employed in common by a person who embeds data and a person who detects embedded data. N blocks (N≦HV) are selected at random from among (HV) blocks, and additional information is embedded into these blocks and detected therefrom. It should be noted that the random number R is generated so that, when bi (R, k) denotes a function for returning the value (0 or 1) of the k-th bit of the random number R, the number of "k"s in the random number R, for which bi(R, k)=0 is established, matches the number of "k"s in the random number R, for which bi(R, k)=1 is established in the range represented by 1≦k≦N. Further, $C_d(k)$ denotes the coefficient of a DCT element d in blocks k (1≦k≦N).

An explanation will be given for the operation for embedding additional information into target image data under the following condition. Function sign(k) is defined as in equation 1.

$$\text{sign}(k) = 1 - 2 * bi(R, k) (= -1 \text{ or } 1) \qquad \text{[Equation 1]}$$

Then, relative to blocks k (1≦k≦N), the coefficients $C_d(k)$ of the DCT element d are changed as in equation 2, and additional information is embedded.

$$C_d(k) = C_d(k) + E_d(k) * \text{sign}(k) \qquad \text{[Equation 2]}$$

In equation 2, $E_d(k)$ defines the embedding volume of the DCT element d in the blocks k, which is determined based on the perceptual model and the average embedding strength b per block, and the following equation 3 is established.

$$\sum_k E_d(k) = bN \qquad \text{[Equation 3]}$$

An explanation will now be given for the operation for detecting additional information embedded into target image data. First, functions $D_d(k)$ and $\sigma^2$ are defined as in equation 4.

$$D_d(k) = C_d(k) * \text{sign}(k) \qquad \text{[Equation 4]}$$
$$\sigma^2 = \sum_k D_d^2(k)/N$$

In this case, the detection strength s is calculated using the following equation 5.

$$s = \sqrt{N} \sum_k D_d(k)/\sigma \qquad \text{[Equation 5]}$$

At this time, relative to the threshold value T (>0)
when s>T, it is ascertained that a bit "1" has been detected
when s<−T, it is ascertained that a bit "0" has been detected
when s is another value (otherwise), it is ascertained that no bit has been detected The second additional information detector 25 of the detection apparatus 20 employs equation 5 to detect the detection strength of the additional information.

When additional information is embedded into a satisfactorily large number N of blocks, and when correlation of the feature values (DCT coefficients) can be ignored, it is expected that the detection strength s, which is obtained when the additional information is detected for an image in which no information has been embedded, conforms to the normal distribution N(0, 1²). Therefore, to detect additional information in an image immediately after it has been embedded therein (i.e., an image for which a conversion, such as compression, has not yet been performed), function $D_d(k)$ can have an approximate value as is shown in equation 6.

$$\sum_k D_d(k) = \sum_k E_d(k) = bN \qquad \text{[Equation 6]}$$

The detection strength s can have an approximate value as shown in equation 7.

$$s = b\sqrt{N}/\sqrt{b^2+\sigma^2} \qquad \text{[Equation 7]}$$

Then, the distribution of the DCT coefficients $C_d(k)$ is replaced with a continuous function.

First, assume that the function f(x) is defined as a probability density function (pdf) for the DCT coefficients $C_d(k)$ that satisfy equation 8.

$$f(x)=f(-x)$$

$$\int f(x)dx = 1 \qquad \text{[Equation 8]}$$

It should be noted that ∫f(x)dx simply means $$\int_{-\infty}^{\infty} f(x)dx \qquad \text{[Equation 9]}$$

(this applies thereafter). That is, the number of DCT coefficients $C_d(k)$ that satisfy a <$C_d(k)$<b is calculated using the following equation.

$$N \int_a^b f(x)dx \qquad \text{[Equation 10]}$$

According to this, equation 5 can be replaced with equation 11.

$$s = \sqrt{N} \left( \int x(f_p(x)-f_m(x))dx \right) / \sqrt{\int x^2(f_p(x)+f_m(x))dx} \qquad \text{[Equation 11]}$$

In equation 11, $f_p(x)$ is the probability density function for blocks that satisfy sign(k)=1, and $f_m(x)$ is the probability density function for blocks that satisfy sign(k)=−1. In addition, these functions satisfy equation 12.

$$f(x)=f_p(x)+f_m(x). \qquad \text{[Equation 12]}$$

Especially when additional information is uniformly embedded into the frames of a target image, and when $f_p(x)=f(x-b)/2$ and $f_m(p)=f(x+b)/2$ are established, equation 11 matches equation 7 by assuming $$\sigma^2 = \int x^2 f(x)dx. \qquad \text{[Equation 13]}$$

The first additional information detector 24 of the detection apparatus 20 employs equation 11 to detect the detection strength of the additional information.

Following this, assume that the additional information is uniformly embedded into the frames of the target image. When $s_q$ denotes the detection strength when the digital data is quantized by using the Q value q, the detection strength $s_q$ is calculated by equation 14.

$$s_q = \frac{\sqrt{N}\sum_n n(F(n,-b,q)-F(n,b,q))}{\sqrt{\sum_n n^2(F(n,-b,q)+F(n,b,q))}} \qquad \text{[Equation 14]}$$

where $$F(n,b,q) = \int_{(n-0.5)q}^{(n+0.5)q} f(x+b)dx/2$$

It is apparent from these equations that the additional information signals are attenuated.

An explanation will now be given for the statistical method used for reducing the attenuation of the signals provided in the additional information. Using the following method, the feature value state reproduction unit 23 of the detection apparatus 20 recovers, from a target image file wherein the embedded additional information has been attenuated by being compressed, the distribution of the feature values in the state immediately following the embedding of the additional information into the target image (in the state wherein the image data has not yet been compressed).

The quantization of the digital data, such as an image file, is an operation for rounding up to nq the value of x that satisfies (n−0.5)q≤x<(n+0.5)q, where n denotes a quantized value and q denotes a Q value. That is, so long as the probability density function f(x) following the embedding of the data is solved, the following equation 15 is established, wherein q denotes the Q value, Num(n) denotes the number of blocks containing the quantized value of n, and N denotes the number of blocks in which additional information is to be embedded.

$$Num(n)=N \cdot F(n,0,q) \qquad \text{[Equation 15]}$$

According to equation 15, when the function F has m parameters, a polynomial for m values n in equation 15 is formed and is solved, so that all the parameters are obtained and the distribution function is acquired for the coefficient values in the blocks in the state immediately following the embedding of information and preceding the quantization of data. When the obtained distribution function is substituted into equation 11, during the additional information detection process, substantially the same detection strength can be reproduced as when information is detected immediately after having been embedded.

Figure 4:
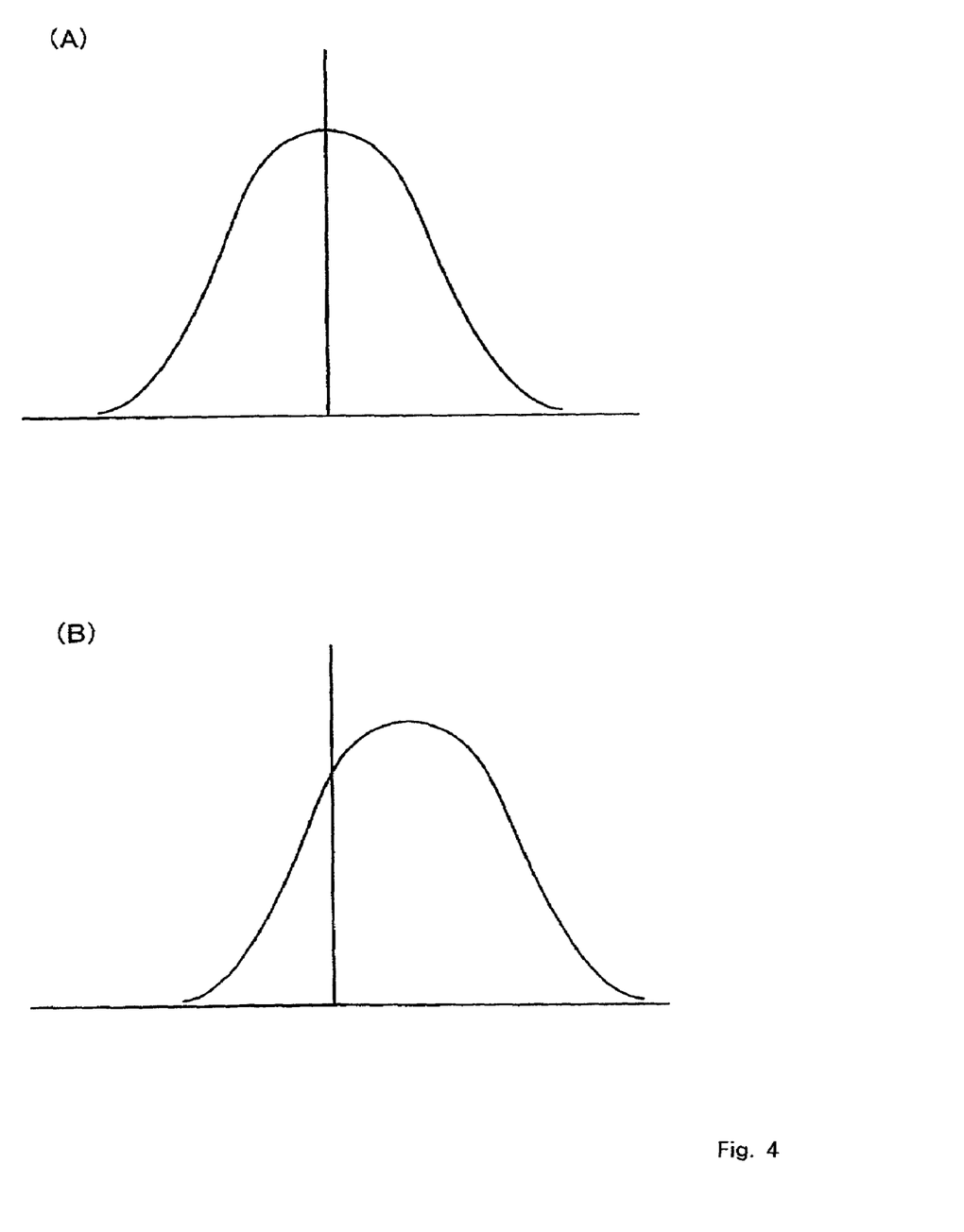
FIG. 4A is a schematic graph showing an example distribution of the DCT coefficients in an AC element in the state wherein additional information has not yet been embedded.
FIG. 4B is a schematic graph showing an example distribution of the DCT coefficients in the AC element in the state wherein additional information has been embedded.

In this case, the distribution of the feature values, such as the DCT coefficients, is a problem. Generally, for the AC elements of the DCT coefficients, the distribution shows a crest shape with the value 0 in the center, as in FIG. 4A, and in many cases, can approximate the function represented by equation 16.

$$f(x)=a*\exp(-b|x|^c) \quad \text{[Equation 16]}$$

It should be noted that in equation 16 a, b and c>0 and f(x) satisfies equation 8, which is generally called a GGD (Generalized Gaussian Distribution).

The following two functions will be explained as examples. Equation 17 represents the distribution when c=2 in equation 16, and is called a Normal Gaussian Distribution. Equation 18 represents the distribution obtained when the function f(x) is approximated by using a linear equation.

$$f(x)=\exp(-x^2/2\sigma^2)/(\sigma\sqrt{2\pi}) \quad \text{[Equation 17]}$$

$$f(x)=(a-|x|)/a^2 \; |x|<a = 0 \text{ another value (otherwise)} \quad \text{[Equation 18]}$$

where $a>0$.

At this time, the additional information is embedded into an image file, so that the probability density function f(x) obtained following the embedding of the additional information conforms to the function obtained by shifting functions in parallel in the x direction (see FIG. 4B). As a result, the information can be embedded with little change in the feature values and without the image quality being deteriorated. Equation 19 shows the probability density function f(x) for equation 17 immediately following the embedding, using equations 4 and 11, of additional information having the embedding strength b.

$$f(x)=\exp(-(x-b)^2/2\sigma^2)/(2\sigma\sqrt{2\pi})$$

$$f(x)=\exp(-(x+b)^2/2\sigma^2)/(2\sigma\sqrt{2\pi}) \quad \text{[Equation 19]}$$

Figure 5:
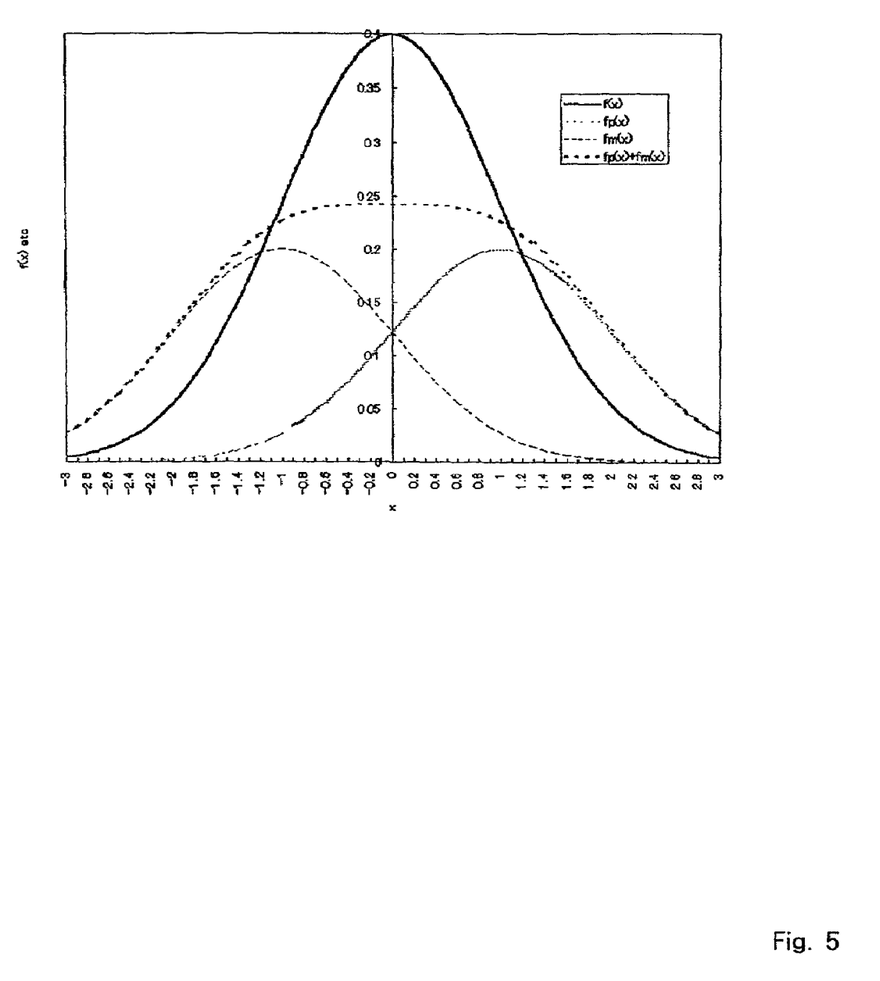
FIG. 5 is a graph showing example distributions, of the feature values of an original image in the states preceding and following the embedding of information in accordance with an embodiment, when these distributions conform to the normal distribution.

FIG. 5 is a graph for when f(x), in the state before information is embedded, is provided by σ=1 in equation 17, and $f_p(x)$ and $f_m(x)$, after the information has been embedded, are provided by b=1 in equation 19. It is apparent from FIG. 5 that the detection result for $f_p(x)+f_m(x)$ (indicated by a thick broken line) draws a line having a shape similar to that of the probability density function f(x) when additional information is embedded. Furthermore, by using equations 4 and 11, equation 20 is obtained for the probability density function f(x) of equation 18 in the state immediately following the embedding of the additional information at the embedding strength b.

$$f(x) = (a-|x-b|)/(2a^2) \quad |x-b|<a$$
$$= 0 \quad \text{another value (otherwise)}$$
$$f(x) = (a-|x+b|)/(2a^2) \quad |x+b|<a$$
$$= 0 \quad \text{another value (otherwise)} \quad \text{[Equation 20]}$$

Since the number of parameters is two (b and σ or b and a) in either case, these parameters can be inversely calculated by establishing a simultaneous equation using the two (the same number as the parameters) quantized values n. Further, when the simultaneous equation is established by using three or more (i.e., equal to or greater than the number of parameters) quantized values n, and when the minimum mean-square method is employed, only a small error is returned when the values of the parameters are calculated.

Assume that, in equation 20, Num_p(n) denotes the number of blocks that have the quantized value n and that satisfy sign(k)=1, and Num_m(n) denotes the number of blocks that have the quantized value n and that satisfy sign(k)=−1. When |b|<q/2 is satisfied and n' is the maximum natural number that satisfies (n'+½)q≦a, equations 21 and 22 are obtained.

$$\text{Num\_p}(0) = \text{Num\_m}(0) \quad \text{[Equation 21]}$$
$$= N \int_{-q/2}^{q/2} fp(x)dx$$
$$= N/2 \int_{-q/2}^{q/2} (a-|x-b|)/(a^2)dx$$
$$= N(4aq - q^2 - 4b^2)/(8a^2)$$

$$\text{Num\_}P(n)=Nq(a+b-nq)/(2a^2)$$

$$\text{Num\_}m(n)=Nq(a+b-nq)/(2a^2) \quad (0<n\leq n') \quad \text{[Equation 22]}$$

The parameters a and b can be obtained by using these equations, and the distribution of the feature values immediately following the embedding of additional information into an image (the state wherein the image data has not yet been compressed) can be reproduced. As is described above, even after the image in which additional information has been embedded is compressed, the distribution of the feature values in the state before the data was compressed can be reproduced and detected. Therefore, even if the Q value used in compression is not known in advance, the additional information can be embedded into the compressed data, while the robustness in the state before the data was compressed can be maintained.

In the above described embodiment, an image file has been employed as digital content in which additional information is to be embedded. In the above explanation, one image frame is used to embed additional information; however, the image file may be either a moving picture or a static picture. For a speech file that has been compressed using quantization, such as MPEG-1 Audio Layer-III (MP3), the distribution of feature values in the stage preceding compression can be reproduced using the same method, and the additional information can be detected at the same detection strength as when the information was detected before compression.

As is described above, the additional information embedding and detection methods for the embodiment can be employed with no problems for the embedding of t bits of additional information into an image frame, for the embedding of additional information across multiple DCT coefficients, and for the employment of multiple Q values for the compression of an image frame.

In this embodiment, the digital content has been compressed using MPEG or JPEG quantization. The method of the invention can be applied when additional information signals are attenuated by data conversion post-processing) other than quantization. For example, assume that a moving picture in which additional information has been embedded is recorded and reproduced using the recording/reproduction device of a predetermined home video system, and then the additional information embedded into the moving picture is detected. In this case, it is known that the frequency property of the feature value used to embed the additional information is g(x), where x denotes a frequency element. Further, when h(x) denotes the distribution of the feature values following the recording and reproduction of the data by the recording/reproduction device, the following equation 23 is established for the probability density function fe(x) immediately following the embedding of the additional information.

$$h(x) = fe(u)/g'(u) \ (u = g^{-1}(x)) \quad \text{[Equation 23]}$$

Therefore, the probability density function fe(x) can be predicted using equation 23. In this case, when multiple frames are employed, a prediction with fewer errors is possible.

Further, assume that the parameters used for embedding additional information are not known, while the function g(x) of the frequency property used for the post-processing is known. In this case, as is described above for data compression, all the parameters can be obtained by employing a number of frames that is equal to or greater than the total number of parameters used for embedding and of parameters used for the probability density function following the embedding of the additional information.

An application for the embodiment will now be described. An experiment for the embedding of additional information into a predetermined static image and for the subsequent detection of the additional information was conducted by using the method of the embodiment of the present invention. For simplification, a model was not used for the adjustment of the image quality, and the additional information was embedded using DCT index=9 at strength b=3, obtained using equation 19. All the 8×8 pixel blocks were employed as target blocks, and a pseudo random number was employed to determine whether a positive value (+) or a negative value (−) should be embedded into the individual blocks (the number of blocks containing positive values corresponded to the number of blocks containing negative values).

Additional information was embedded into a bitmap image (BMP domain) using the method of the embodiment. JPEG compression at various compression ratios was performed for the image file in which additional information had been embedded, and the image file was returned to the bitmap image and the additional information was detected therefrom. Further, in order to confirm that the detected value is not increased when the detection of additional information is performed for an image to which no information has been added, the detection process was also performed for an image in which no additional information had been embedded.

Figure 6:
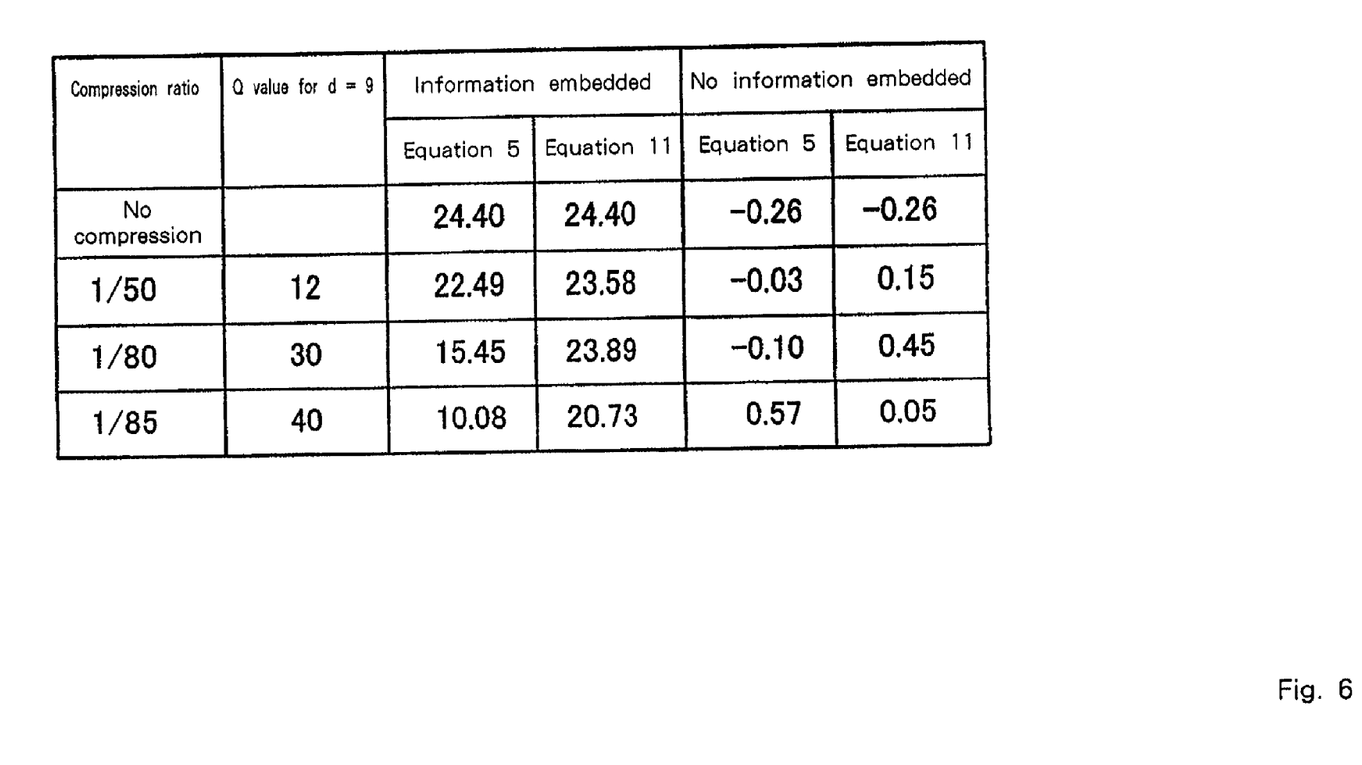
FIG. 6 is a table showing an example application of the present invention embodiment and of the conventional art.

For the detection process, the method using equation 11 in this embodiment and the method using equation 5, which corresponds to the conventional art, were employed. For the method using equation 11, additional information was detected after the distribution of the feature values (DCT coefficients), obtained by embedding the additional information, had recovered to a state close to that before compression. By employing the method that uses equation 5, the additional information was detected in the state wherein the distribution of the coefficients had been quantized by compression (the signal was attenuated). FIG. 6 is a table showing the detection results (detection strengths).

While referring to FIG. 6, when the compression ratio is small, the detection strength when equation 11 (this embodiment) is employed does not differ greatly from the detection strength when equation 5 (the conventional art) is employed. This is because satisfactory detection results can be originally obtained without reproducing the coefficient distribution. However, when the compression ratio is increased, it is found that the detection strength is greater when equation 11 is used.

Thus, as is described above, according to the present invention, the robustness required to resist the effects of data compression or of data conversion can be provided for additional information that is embedded into digital content. Furthermore, according to the present invention, even when a quantized value used for data compression is not known in advance, compressed additional information can be embedded while maintaining the robustness, relative to data compression, possessed by the additional information before compression.

It is noted that the present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is further noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more promi-

What is claimed is:

1. A data embedding apparatus for embedding additional information into digital content comprising:
a feature value state setting unit, for setting the post-embedding state for feature values of discrete cosine transform coefficients for said digital content that are used for embedding said additional information, so that after said additional information has been embedded into said digital content, the distribution of said feature values conforms to a predetermined function; and
an additional information embedding unit, for changing said feature values of said digital content based on said state set by said feature value state setting unit, wherein the parameters of the distribution function in the embedding process are inversely calculated and the additional information is detected and recovered from the digital content for which signals have been attenuated due to compression or post-processing.

2. The data embedding apparatus according to claim 1, wherein, when said feature values used for embedding said additional information are discrete cosine transform coefficients, said feature value state setting unit sets said post-embedding state so that, after said additional information has been embedded into said digital content, the distribution of said discrete cosine transform coefficients conforms to a predetermined function; and
wherein said additional information embedding unit changes said discrete cosine transform coefficients of said digital content, so that said distribution of said discrete cosine transform coefficients conforms to said predetermined function.

3. A data embedding apparatus for embedding additional information into a digital image comprising:
a feature value state setting unit, for setting a post-embedding state of the distribution of feature values of said digital image that are used for embedding additional information;
a feature values rearrangement unit, for rearranging feature values for said digital image based on the sizes, and for employing a perceptual model to indicate a permissible range for the changes in the sizes of said feature values; and
an additional information embedding unit, for changing said feature values of said digital image based on said post-embedding state set by said feature value state setting unit, for changing the feature values correlated by said feature value rearrangement unit, and for changing said permissible range for said changes, wherein said feature value state setting unit sets said post-embedding state, so that the distribution of said feature values, after said additional information has been embedded into said digital content, conforms to a predetermined function.

4. The data embedding apparatus according to claim 3, wherein said additional information embedding unit changes said feature values, while adjusting said feature values so that said feature values fall within said permissible range determined based on a predetermined rule.

5. A detection apparatus for detecting predetermined additional information in digital content comprising:
a feature value state reproduction unit, for reproducing, based on the distribution of predetermined feature values for digital content in which said predetermined additional information is embedded and for which a predetermined data conversion has been performed, the distribution of feature values for said digital content in the state existing prior to the performance of data conversion, wherein said data conversion is data compression using quantization performed for the digital content in which the additional information has been embedded; and
an additional information detector, for detecting said additional information embedded into said digital content based on the distribution of said feature values reproduced by said feature value state reproduction unit, for said digital content for which data conversion is performed.

6. The detection apparatus according to claim 5, wherein said feature value state reproduction unit obtains a function used to embed additional information into digital content, calculates a parameter of said function based on said function and the distribution of feature values in said digital content for which data conversion has been performed, and employs said parameter to reproduce the distribution of said feature values for said digital content in the state existing prior to the performance of data conversion.

7. A detection apparatus for detecting predetermined additional information in digital content comprising:
a quantized value calculation unit, for calculating, based on the distribution of feature values of digital content that has been compressed by quantization and then decompressed, a quantized value used for data compression; and
an additional information detector, for employing said quantized value, obtained by said quantized value calculation unit, to detect additional information embedded into said digital content.

8. The detection apparatus according to claim 7, further comprising a feature value state reproduction unit for employing said quantized value, obtained by said quantized value calculation unit, to reproduce the distribution of feature values, for said digital content, as in the state existing before the performance of data compression, wherein said additional information detector detects said additional information embedded into said digital content based on the distribution of said feature values for said digital content, reproduced by said feature value state reproduction unit, as in the state existing before data compression was performed.

9. A detection apparatus for detecting predetermined additional information in digital content comprising:
determination means, for determining, alter additional information has been embedded into digital content, whether a predetermined data conversion process has been performed for said digital content, wherein said data conversion is data compression using quantization performed for the digital content in which the additional information has been embedded; and
detection means, for detecting said additional information embedded into said digital content, wherein, when said determination means ascertains that said predetermined data conversion has been performed for said digital content in which said additional information has been embedded, said detection means obtains the function used to embed said additional information into said digital content, and employs said function to detect said additional information embedded into said digital content.

10. A data processing method for embedding predetermined additional information into digital content comprising the steps of:
  even after data conversion has been performed, specifying a function that can reproduce, for said digital content in which said additional information is embedded, the detection strength in the state existing before the performance of said data conversion, wherein said data conversion is data compression using quantization performed for the digital content in which the additional information has been embedded; and
  embedding said additional information into said digital content in accordance with said function.

11. A data processing method for embedding predetermined additional information into digital content and for detecting said additional information embedded into said digital content comprising the steps of:
  setting the post-embedding state for feature values of a digital content that are used for embedding additional information, so that the distribution of said feature values of said digital content in which additional information has been embedded conforms to a predetermined function;
  changing said feature values of said digital content based on said post-embedding state;
  determining whether data conversion has been performed for said digital content in which said additional information has been embedded;
  when it is ascertained said data conversion has been performed for said digital content, employing said distribution of predetermined feature values of said digital content to reproduce the distribution of the feature values for said digital content in the state existing before the performance of said data conversion; and
  detecting said additional information embedded into said digital content based on the distribution of the feature values for the reproduced digital content in the state existing before the performance of said data conversion.

12. The data processing method according to claim 11,
  wherein said step of setting said post-embedding state of said feature values includes the step of determining a function used to embed said additional information into said digital content, and
  wherein said step of reproducing the distribution of said feature values for said digital content in the state existing before the performance of said data conversion includes the steps of:
    calculating a parameter for said function based on said function and the distribution of said feature values for said digital content in which the data conversion has been performed; and
    employing said parameter to reproduce the distribution of said feature values for said digital content in the state existing before the performance of said data conversion.

13. The data processing method according to claim 12, wherein, at said step of determining said function, said function is determined based on detection information obtained when the additional information detection process is performed for digital content in which embedding of said additional information has not yet been performed.

14. A method for embedding predetermined additional information into digital content, said method comprising:
  setting the post-embedding state for feature values of a digital content that are used for embedding additional information, so that the distribution of said feature values of discrete cosine transform coefficients of said digital content in which additional information has been embedded conforms to a predetermined function,; and
  changing said feature values of said digital content based on said post-embedding state, wherein the parameters of the distribution function in the embedding process are inversely calculated and the additional information is detected and recovered from the digital content for which signals have been attenuated due to compression or post-processing.

15. A method for controlling a computer to detect predetermined additional information embedded into digital content said method comprising:
  reproducing, based on the distribution of predetermined feature values for digital content in which said predetermined additional information is embedded and for which a predetermined data conversion has been performed, the distribution of feature values for said digital content in the state existing prior to the performance of data conversion, wherein said data conversion is data compression using quantization performed for the digital content in which the additional information has been embedded; and
  detecting said additional information embedded into said digital content based on the distribution of said reproduced feature values for said digital content in the state existing prior to the performance of data conversion.

16. An article of manufacture comprising a computer usable medium having computer readable program code means embodied therein for causing data processing, the computer readable program code means in said article of manufacture comprising computer readable program code means for causing a computer to effect the steps of claim 11.

17. An article of manufacture comprising a computer usable medium having computer readable program code means embodied therein for causing the embedding of predetermined additional information into digital content, the computer readable program code means in said article of manufacture comprising computer readable program code means for causing a computer to effect the steps of claim 14.

18. An article of manufacture comprising a computer usable medium having computer readable program code means embodied therein for causing detection of predetermined additional information embedded into digital content, the computer readable program code means in said article of manufacture comprising computer readable program code means for causing a computer to effect the steps of claim 15.

19. A program storage device readable by machine, tangibly embodying a program of instructions executable by the machine to perform method steps for causing data processing, said method steps comprising the steps of claim 11.

20. A program storage device readable by machine, tangibly embodying a program of instructions executable by the machine to perform method steps for causing the embedding of predetermined additional information into digital content, said method steps comprising the steps of claim 14.

21. A program storage device readable by machine, tangibly embodying a program of instructions executable by the machine to perform method steps for controlling a computer to detect predetermined additional information embedded into digital content, said method steps comprising the steps of claim 15.

22. A computer program product comprising a computer usable medium having computer readable program code means embodied therein for causing the embedding of additional information into digital content the computer readable program code means in said computer program product comprising computer readable program code means for causing a computer to effect the functions of claim 1.

23. A computer program product comprising a computer usable medium having computer readable program code means embodied therein for causing the embedding of additional information into a digital image the computer readable program code means in said computer program product comprising computer readable program code means for causing a computer to effect the functions of claim 3.

24. A computer program product comprising a computer usable medium having computer readable program code means embodied therein for causing the embedding of additional information into digital content, the computer readable program code means in said computer program product comprising computer readable program code means for causing a computer to effect the functions of claim 1.

25. A computer program product comprising a computer usable medium having computer readable program code means embodied therein for causing for detection of predetermined additional information in digital content, the computer readable program code means in said computer program product comprising computer readable program code means for causing a computer to effect the functions of claim 5.

26. A computer program product comprising a computer usable medium having computer readable program code means embodied therein for causing for detection of predetermined additional information in digital content, the computer readable program code means in said computer program product comprising computer readable program code means for causing a computer to effect the functions of claim 7.

27. A computer program product comprising a computer usable medium having computer readable program code means embodied therein for causing for detection of predetermined additional information in digital content, the computer readable program code means in said computer program product comprising computer readable program code means for causing a computer to effect the functions of claim 9.

* * * * *